June 30, 1936.  A. J. DIESCHER  2,045,760
METHOD OF AND APPARATUS FOR CONTROLLING
OPERATION OF A GAS TRANSPORTATION LINE
Filed Dec. 6, 1933   5 Sheets-Sheet 3

INVENTOR.
Alfred J. Diescher
BY
ATTORNEY.

June 30, 1936.  A. J. DIESCHER  2,045,760
METHOD OF AND APPARATUS FOR CONTROLLING
OPERATION OF A GAS TRANSPORTATION LINE
Filed Dec. 6, 1933   5 Sheets-Sheet 4

INVENTOR.
Alfred J. Diescher
BY
ATTORNEY.

June 30, 1936.　　　　A. J. DIESCHER　　　　2,045,760
METHOD OF AND APPARATUS FOR CONTROLLING
OPERATION OF A GAS TRANSPORTATION LINE
Filed Dec. 6, 1933　　　5 Sheets-Sheet 5

INVENTOR
Alfred J. Diescher.
BY
ATTORNEY

Patented June 30, 1936

2,045,760

UNITED STATES PATENT OFFICE 2,045,760

METHOD OF AND APPARATUS FOR CONTROLLING OPERATION OF A GAS TRANSPORTATION LINE

Alfred J. Diescher, Winfield, Kans., assignor of one-half to M. L. R. Diescher, Winfield, Kans.

Application December 6, 1933, Serial No. 701,242

23 Claims. (Cl. 137—78)

This invention relates to a method of and apparatus for controlling operation of a gas transportation line wherein preferably a plurality of compressor stations are operating to maintain the required pressures to effect flow of gas from its source of supply to meet demands of the market.

In order to deliver a substantially uninterrupted flow of gas to market, it is necessary that all of the compressor stations operate in close harmony with each other for the reason that, should one station fail, all of the other stations are thrown out of balance and the system is disrupted. Due to widely fluctuating demands of the market during the different hours of the day caused by variations in industrial and domestic uses of the gas, it is difficult to operate the stations in balance. To meet these varying demands, it is necessary that the dispatcher of the pressure department have a keen foresight as to the required amounts of gas under all variations of demand, in order that he may dispatch the required operating pressures to the respective stations to meet the demands when they occur. In this operation of the compressor stations, it is apparent that the dispatcher may not accurately foretell the amount of pressure required, or some error may occur as to the time that pressure adjustments are to be made at the respective stations.

Should the market demands exceed the dispatcher's forecast, the excessive withdrawal of gas pulls down the discharge pressure of the station closest to the market, and, when that station is speeded up, to build up its discharge pressure, it pulls down the discharge pressure of the station behind it and so on up the line until all the stations are operating out of balance and the system is entirely disrupted. Also when a line break or mishap to one of the compressor stations occurs, the drop in the intake pressure to a station operating under high discharge pressures results in pressure ratios which exceed the safe operation for which that station was designed.

These hazards increase as the lines grow longer with a greater number of compressor stations and in lines supplying towns along its length having different weather conditions. These hazards also increase when the stations are equipped with engines and compressors designed for operation on low compression ratios as they cannot pull the load from any degree of intake pressure, but are limited in power to the extent intake pressures are pulled down to force gas ahead to the market. In long lines where it takes days to transport a new supply of gas, demand fluctuation and sudden climatic changes also seriously affect operation of the lines because the main reliance for security of supply and efficiency of service lies principally in the gas stored in the market leg of the line and to whatever degree the intake pressures can be pulled down within the station power range on the next immediate legs from the market end with the remaining stations trying to build up discharge pressure with an accelerated speed, or by placing an increased number of engine units into operation.

An increase of speed or of the number of units operating may pull down intake pressures behind the station to a point where the engines cannot pull the load on low compression ratios. The field station, as well as the relay stations, all must, therefore, fight to get gas ahead of them during these periods of stress. It is thus apparent that the stations must all operate in balance to render most efficient service.

As milder seasons of the year approach and the danger of weather fluctuations and blizzards pass, the market demand slackens.

It may be hazardous for men to work in compressor stations or along pipe lines handling inflammable gas at pressures of 600 pounds or more per square inch. Leakage loss and pipe line or compressor blow-outs occur when the compressor stations are operating at their highest limits. It is, therefore, good practice to carry no higher discharge pressures than are needed to adequately supply the market and protect the supply and efficiency of the service against sudden fluctuating demands normally occurring during the different seasons of the year.

Gradual reduction of discharge pressure as the market demand lessens reduces the step-up or compression ratio as the intake does not drop in the same proportion as the discharge pressure. The result is that on narrow or low compression ratio power installed stations the compressor power demand reduces so rapidly that on some conditions of light load the ratio of discharge to intake pressure drops to within the compression ratio where the engines can take the supply at any intake below that discharge. Thus it is apparent that in high pressure long line installation there is a greater need for automatic regulation of station operation.

It is, therefore, the principal object of the present invention to provide a method and apparatus for automatically controlling the compressor stations in order that all of the stations will operate in balance to provide safe and economic operation of the pipe line and to make more certain a continuous delivery of an ample volume of gas to meet fluctuating market demands.

In accomplishing these and other objects of the invention, I have provided improved details of structure and method of pipe line control, as illustrated in the accompanying drawings, wherein.

Referring more in detail to the drawings:

1 designates a control table which is preferably placed in the superintendent's office at each one of the stations in a pipe line, the superintendent setting the control mechanism to conform to the dispatcher's instructions, or the dipatcher may himself set the control mechanism through remote control, as later described, for maintaining the maximum discharge pressures to be carried at the respective stations. The maximum pressure can, if desired, be set at a different point for each station to compensate for draw-offs between stations, fuel for the engines, leakage, etc., from the lines. All the stations can, however, be operated on equal discharge pressures disregarding draw-offs in the line so that the resultant effect will be a higher terminal pressure at the end of the line. If this terminal pressure is greater than desired at the time, the control can be set at stations beyond the points of large draw-offs at lower discharge pressure for the same volume and thus reduce the terminal pressure an amount needed to drop the pressure at the terminal of the line.

The control at the terminal station operates by regulating its compressors to maintain a fixed predetermined discharge pressure within close limits, thereby controlling the intake pressure which works back upon the discharge pressure of the preceding station, causing its control to adjust and maintain the desired discharge pressure and so on up the line to the field station as later described.

Figure 1:
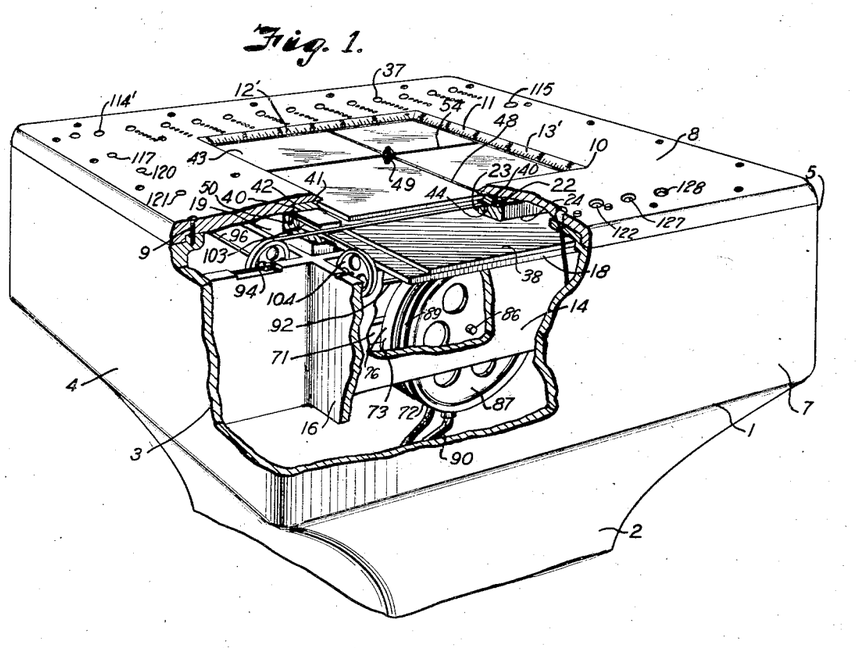
Fig. 1 is a perspective view of the table portion of a station control mechanism constructed in accordance with my invention.

The table 1 includes a pedestal 2 for supporting a substantially hollow, rectangular-shaped table top 3 including spaced side walls 4 and 5, end walls 6 and 7, and a top wall 8 supported on the upper edges of the side and end walls and secured thereto by fastening devices 9.

Figure 3:
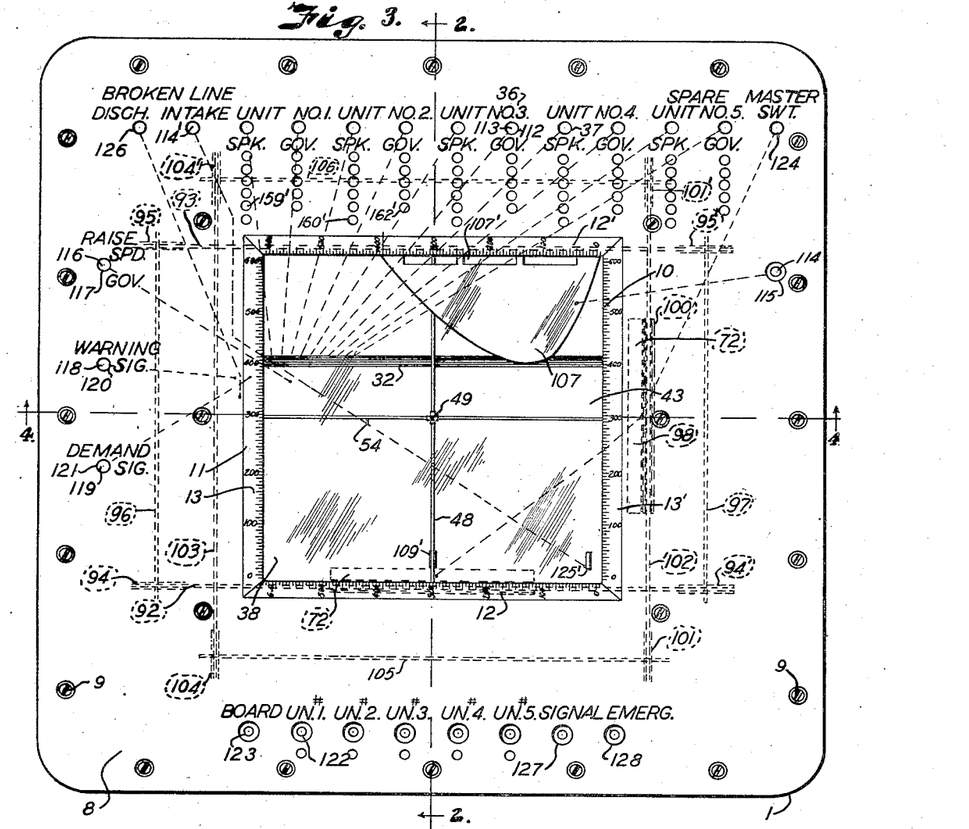
Fig. 3 is a plan view of the control table particularly illustrating signals for indicating the requirements necessary to maintain certain discharge pressures and to automatically control the spark and governors of the respective engine units employed in the compressor stations.
Figure 4:
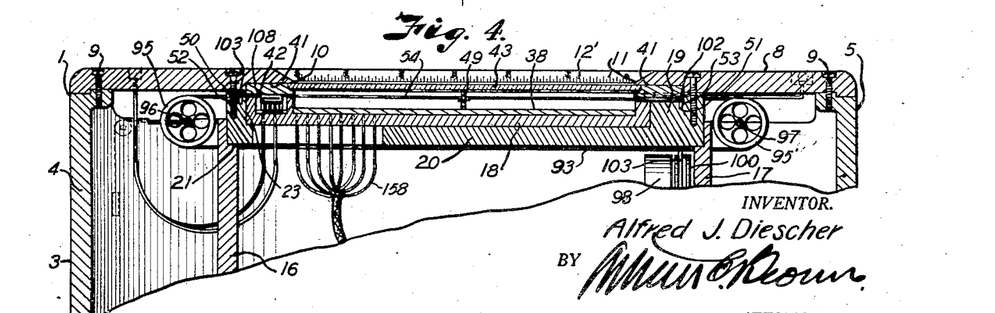
Fig. 4 is a vertical cross sectional view through the table on the line 4—4, Fig. 3.

The table top 8 is provided substantially in the center thereof with a rectangular-shaped opening 10 having a downwardly bevelled peripheral edge 11 carrying intake and discharge pressure scales 12—12' and 13—13' at opposite sides of the opening, respectively. In the device illustrated, the intake and discharge pressure scales are from zero to 600 pounds pressure although the pressure scales may vary according to the maximum pressures to be carried in the line.

Extending between the side walls 4 and 5 are spaced partition walls 14 and 15 located substantially below the scales 12—12'. Connecting the end walls 6 and 7 and the partitions 14 and 15 are vertical partitions 16 and 17 located below the scales 13—13'.

The upper edges of the pairs of walls just described are spaced downwardly from the under face of the table top 8 to provide a support and a space for a movable switch board 18 slidingly mounted in a rectangular-shaped frame 19.

The frame 19 includes a horizontally positioned bottom 20 received in rabbet grooves 21 in the pairs of partitions and provided on its upper face with a flange 22 extending along the side and ends of the bottom 20 and having inner faces 23.

Figure 2:
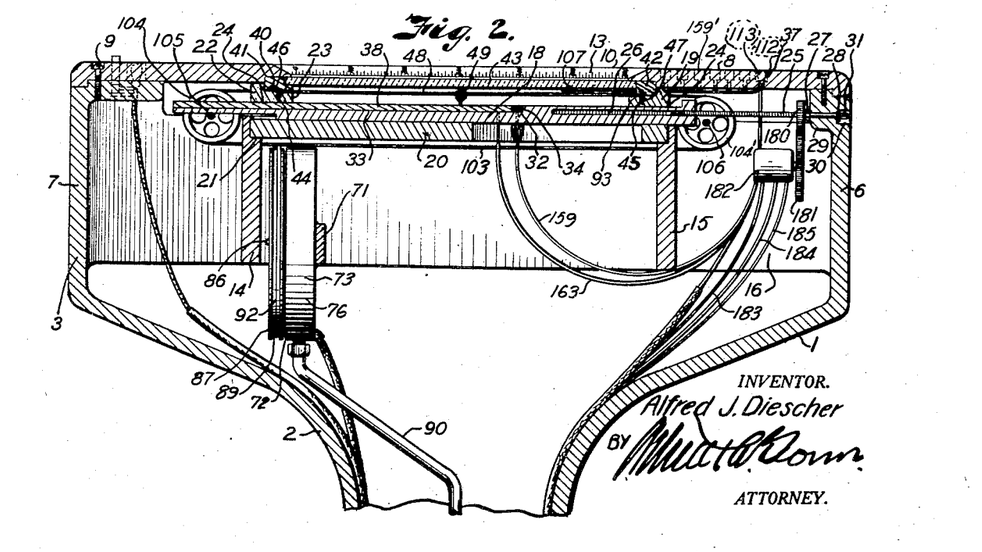
Fig. 2 is a vertical cross sectional view on the line 2—2, Fig. 3.

The side flanges 22, Fig. 2, are provided with longitudinal slotted openings 24 extending along the upper edges of the partition walls 14 and 15 and terminating adjacent the end flanges 22 to form a guide for a switch board 18 which is movable across the bottom 20 by means of a threaded shaft 25 that is rotatably mounted in the upper portion of the wall 6 and has its threaded end projecting into a threaded bore 26 formed in the switch board.

The shaft 25 is anchored in the side wall 6 by collars 27 and 28 engaging the inner face of an inwardly extending flange 29 and the bottom of a socket 30 formed in the outer face of the wall 6, as best illustrated in Fig. 2. The outer end of the shaft is provided with a polygonal shaped head 31 to receive a key (not shown) by which the shaft may be rotated by the superintendent to move the switch board across the opening 10 longitudinally of the discharge pressure scales 13, 13' to position a plurality of switch contact bars 32 relatively to a predetermined discharge pressure which is to be maintained in the line, as indicated on the respective scales. The shaft 25 is also provided with an automatic actuating mechanism whereby the board 18 may be set by the dispatcher, as hereinafter described.

Figure 5:
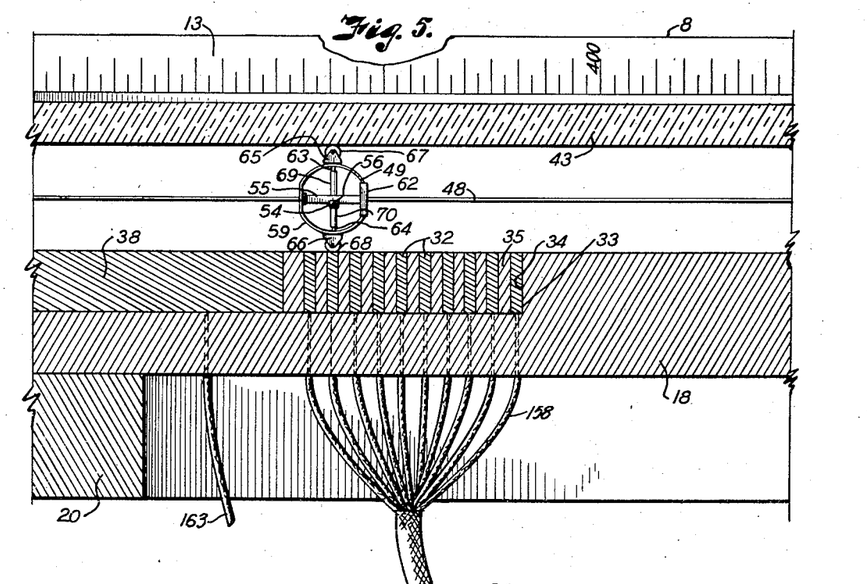
Fig. 5 is an enlarged detail cross sectional view through the contact bars for controlling the spark and governors of the engine units.

The board 18 is preferably constructed of nonconductive material and is provided adjacent its side opposite to the shaft 25 with a reduced portion 33 extending across the width thereof and forming a shoulder 34 to provide a seat for the contact bars 32 so that their upper face lies flush with the upper face of the thicker portion of the board. The contact bars 32 are best illustrated in Fig. 5 and comprise a series of metallic contact elements spaced apart by insulating strips 35 to insulate the contact bars from each other so that each bar forms a part of an electric circuit which in the illustrated instance is for controlling the spark and governor of the respective engine units of a station. The bars may, therefore, be arranged in pairs, one of each pair being connected into the ignition circuit and the other into a circuit for controlling the governor speed of each one of the engines in the compressor station. In the device illustrated, there are five pairs of contact bars representing four working engine units and a spare unit as indicated by the legends 36 aligning with apertures 37 having located therein electric signals to indicate when the respective bars are brought into the circuit by movement of the contact switch later described.

The contact elements are preferably so wired that the spare or any one of the other units may be controlled through any one of the contact elements by closing a system of switches as later described.

Filling in the cut-out portion of the table is a metallic plate 38 connected into circuit with motors 39, (Fig. 14), controlling the governors for the respective engine units.

It may be desirable to make the contact and/or spark bars of various widths, and it may also be desirable to make the highest bar a spark bar extending to the top of the discharge scale to close down the units in case of a sudden jump in the discharge pressure caused, for example, by sudden closing of a discharge gate at the station or by a sudden closing of a check valve just ahead of the station due to a line break.

In order to enclose the switch board 18 and the main contact switch, the upper edges of the flanges 22 are provided with rabbet grooves 40 cooperating with similar grooves 41 in the under face of the top 8 to support a frame 42 carrying a preferably transparent glass panel 43 covering the opening 10, as best illustrated in Figs. 1 and 2.

Formed in the upper face of the end flanges 22 are longitudinal grooves 44 and 45, respectively, in which guides 46 and 47 are slidably mounted to carry a rod 48 extending therebetween across the top of the switch board 18 to slidably mount a main switch contact member 49. Similar guide grooves 50 and 51 are provided in the side flanges 22 to mount similar guide members 52 and 53 carrying a rod 54 extending across the board 18 and at right angles to the rod 48, as best illustrated in Figs. 1 and 3.

Figure 12:
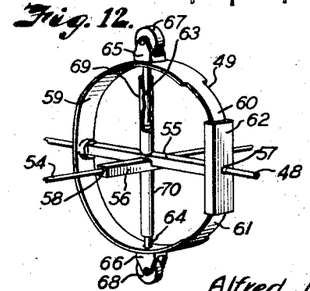
Fig. 12 is an enlarged perspective view of the switch moved by the pressure actuated motors.

The switch member 49 includes cross arms 55 and 56 offset laterally from each other and provided with longitudinal bores 57 and 58 having a diameter to slidably receive the rods 48 and 54. Fixed to one end of the arm 55 is a substantially circular spring band 59 having reduced ends 60 and 61 slidably inserted in a guide block 62 attached to the opposite end of the arm 55.

Pivotally supported by pins 63 and 64 extending through the spring band 59 are roller supports 65 and 66 mounting rollers 67 and 68 adapted to engage the under face of the glass panel 43 and the upper face of the switch board, respectively.

In order to mount the pins 63 and 64 in vertical alignment with each other, the arms 55 and 56 are provided at their crossing point with laterally extending tubular guide members 69 and 70 of shorter length than the diameter of the band to permit compression of the spring for movement of the rollers 65 and 66 toward each other.

It is thus apparent that the roller 67 acting against the surface of the glass panel will apply pressure on the roller 68 to retain it in electrical contact with the switch board 18. It is also apparent that when the wire 48 is moved laterally across the switch board toward either of the scales 13 or 13', the switch member 49 is moved longitudinally on the wire 54 and when the wire 54 is moved across the switch board toward the scales 12 or 12', the switch is moved longitudinally on the rod 48 so that the switch contact roller 68 may be moved over the area of the switch board by means of the rods 48 and 54 under influence of the intake and discharge pressures occurring in the inlet and discharge lines of the compressor stations, as now to be described.

Figure 11:
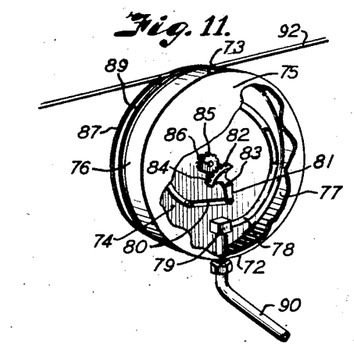
Fig. 11 is a perspective view of one of the pressure actuated motors for operating the guide rails moving the main switch contact in accordance with discharge and intake pressures of a station.

Fixed to a bar 71 extending between the partitions 16 and 17, and spaced from the partition 14, is an actuator 72 operably connected with the intake line of the station. The actuator 72 is best illustrated in Fig. 11 and includes a drum-shaped housing 73 having front and rear plates 74 and 75 connected by a cylindrical band 76 to form an interior chamber 77 for mounting a Bourdon tube 78 of suitable design. The one here illustrated is of the coil type and has one end fixed to a tubular post 79 carried by the band 76 and its free end operably connected by a link 80 with the arm 81 of a gear segment 82.

The gear segment 82 is pivotally mounted on a pin 83 extending from the inner face of the plate 74. Meshing with the teeth 84 of the gear segment is a pinion 85 fixed to a shaft 86 that is rotatably mounted in the axis of the housing. Fixed to the shaft 86 exteriorly of the housing is a pulley 87 having preferably the same diameter as the diameter of the housing and provided with a peripheral groove 89.

Connected with the tubular post 79 is a conduit 90 connected with the intake line 91 delivering gas to the compressor station so that the pressure in the intake will act on the Bourdon tube 79 to rotate the pulley 87. The housing 73 is mounted so that the pulley 87 aligns with the guide grooves 44 and 45 carrying the guides 46 and 46.

Figures 6, 7, 15:
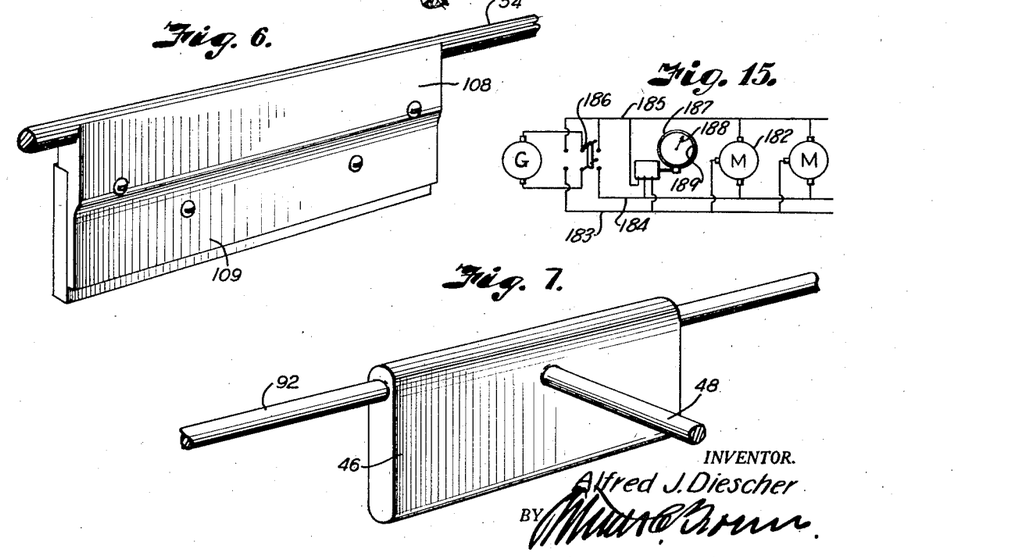
Fig. 6 is an enlarged detail perspective view of the switch closing contacts for the warning and demand signals advising the station operator the necessity of starting the compressors to maintain the required discharge pressures.
Fig. 7 is a perspective view of a guide member for the switch guide rails.
Fig. 15 shows a diagrammatic view of the wiring for the motors actuating the switch boards, whereby they can be set from the dispatcher's office.
Figure 8:
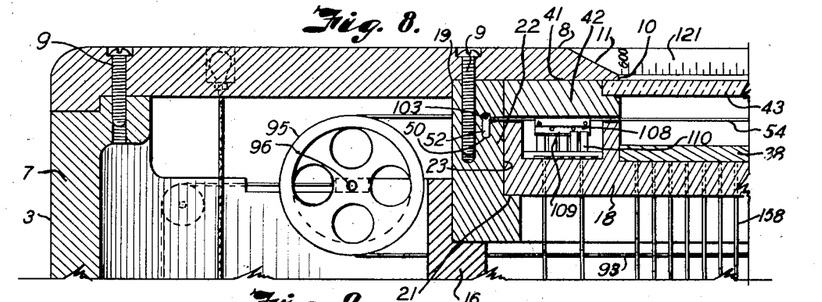
Fig. 8 is an enlarged detail vertical sectional view of the left hand side of the section illustrated in Fig. 4.
Figure 9:
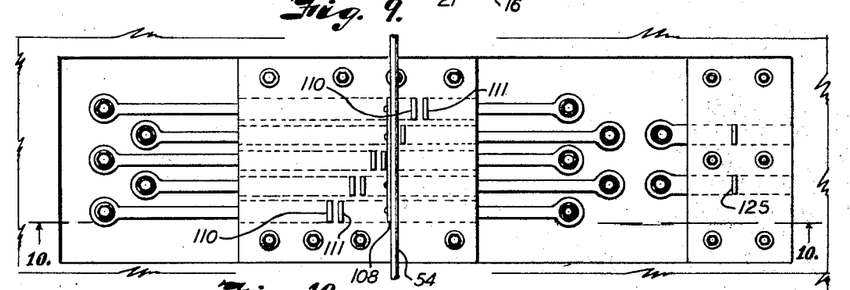
Fig. 9 is an enlarged plan view of the warning and demand contacts, the view being turned at right angles to the views illustrated in Figs. 4 and 8.
Figure 10:
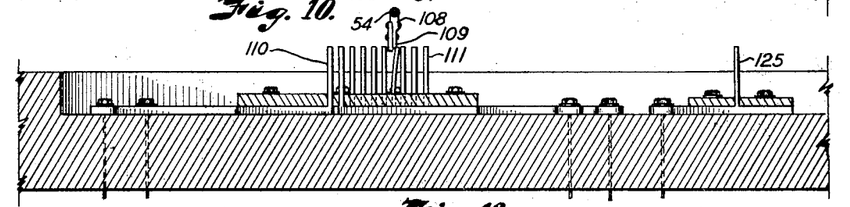
Fig. 10 is a longitudinal, sectional view on the line 10—10, Fig. 9.

Fixed to the opposite ends of the guides 46 and 47, as best illustrated in Fig. 7, are endless cables 92 and 93 operating over pairs of pulleys 94—94' and 95—95' which are fixed to shafts 96 and 97 that are rotatably supported on the partitions 14 and 15 exteriorly of the partitions 16 and 17, as best illustrated in Fig. 1.

The endless cable 92 extends entirely about the groove 89 formed in the pulley 87 and is attached to the lower diameter of the pulley when the cross wire 48 is in substantially central position on the scales 12—12' and the pressure in the intake line is equal to 300 pounds.

It is thus apparent that should the pressure in the intake line increase, the pressure will tend to increase the diameter of the Bourdon tube to rotate the pulley 87. Operation of the pulley 87 causes movement of the endless cables 92 and 93 to carry the rod 48 toward the left in Fig. 3 to indicate the increased pressure on the scales 12—12', or, should the intake pressure drop, the Bourdon tube will cause the pulley 87 to move the rod 48 in reverse direction.

Mounted adjacent the partition 17 is a similarly constructed pressure operated actuator 98 operably connected with a conduit 99 leading to the discharge line delivering gas from the compressor station for actuating a pulley 100 located in alignment with the guide groove 51, and operating thereover and over spaced pulleys 101 and 101' is an endless cable 102 having its ends attached to the ends of the guide 53.

Attached to the ends of the guide 50 at the opposite end of the rod 54 is an endless cable 103 operating over pulleys 104 and 104' aligning with the pulleys 101 and 101', the pulleys 101—104 and 101'—104' being fixed to shafts 105 and 106 respectively similar to the pulley shafts previously described so that the discharge pressure acts to move the rod 54 relatively to the scales 13—13' to indicate the pressures in the discharge line.

When the rods 48 and 54 are crossed in the center of the opening 10, the intake and discharge pressures are indicated at 300 pounds respectively, and the switch contact 49 is exactly in the center of the scale and contacting the plate 38. In this position, the compressor units are in operation to build up the discharge pressure to the amount set by the dispatcher.

Assuming that the desired pressure is 400 pounds, the threaded shaft 25 will be operated to locate the bars 32 in alignment with the designation 400 on the discharge pressure scales 13—13', as illustrated in Fig. 3. As the compressors build up the discharge pressure, the increase in pressure effects movement of the rod 54 toward the first of the bars 32, and as the discharge pressure approaches 400 pounds, the contact roller 68 will contact the first of the bars to establish circuit to the governor controlling operation of the number four unit to slow down operation of that compressor.

If the pressure continues to rise, the roller 68 will then contact the second bar to break the circuit to the ignition of the number four unit, thereby automatically cutting out operation of the number four unit. Should the pressure continue to rise, the contact 68 will likewise slow down operation of the number three unit and finally stop operation of the unit by effecting opening of the ignition circuit.

Should the demand be such as to maintain the pressure at 400 pounds with three of the engines in operation, the contact will remain in position on the neutral bar below the contact bar controlling the speed of the third unit, but should the pressure continue to rise the engine number two will be next in line to be controlled, and so on until all of the engines are cut out.

If for any reason the intake pressure should drop below the safe working ratio with the discharge pressure, I may provide for stopping all of the engines for the respective units; for example, pressure rations of 400 pounds intake to 600 pounds discharge or from approximately 100 pounds intake to 400 pounds discharge are safe ratios for which the engine power was designed, but, should the relative ratio of the intake and discharge pressures increase, the roller contact 68 will move under a plate 107 that is in contact with the under side of the glass panel 43 and attached to the frame work at a point adjacent the scale 12'. A sudden drop in pressure will effect movement of the bar 48 to the right, Fig. 3, to cause it to move toward the contact plate 107 to effect opening of the ignition circuits to all of the engines.

The plate 107 adjacent the scale 12' is provided with a series of spaced slots 107' so that the position of the wire 48 may be read therethrough relatively to the calibrations on the scale. It is practicable that the contact plate 107 need not contact all ignition circuits, because under some conditions it may be found ample to contact only one unit circuit, while under other conditions more unit circuits must be contacted therewith depending upon the degree of efficiency and ratio installation of the power units. To cut out one unit will both lower the discharge pressure and raise the intake pressure so as to, in many instances, correct the excess ratio. I, therefore, prefer to selectively connect as many units as required to be cut out by the plate 107 as is hereinafter described.

When the discharge pressure drops due to increased demand of the market, I have provided means for signalling the superintendent that additional engines should be started to help build up the pressure to that set by the dispatcher. To accomplish this, the rod 54 is provided with a depending plate 108 carrying a contact bar 109 movable over a series of spaced contacts 110 and 111 for each of the engine units in the station. These contacts 110 and 111 are arranged in relation with the contact bars 32 previously described so that as the rod 54 moves in the opposite direction caused by drop in discharge pressure, the contact 110 will be energized to close circuit to a signal indicating to the engine man to make ready to start the number one unit.

As the pressure continues to drop, the contact bar will engage the contact to close circuit to a signal indicating to the engine man that it is time to start the first engine. Should the pressure continue to drop after the first engine is started, the bar will contact the warning to make ready for the second engine unit, and, should the pressure continue to drop, the bar will close circuit to the signal indicating that the second unit should be placed in operation, and so on until the discharge pressure is raised to the required amount set by the location of the contact bars 32.

In order to visibly indicate when the engines are cut out of circuit by the contact 68, each of the bars 32 is connected with a signal light 112 carried by the table top 8 and visible through openings 113 located in alignment with the designations 36 previously mentioned. The circuit including the plate 107 is also provided with a light 114 visible through an opening 115 in the table top. The contact plate 38 is also connected in circuit with a light 116 visible through an opening 117 in the table top. The warning and demand contacts for the respective engine units are also provided with signal lights 118 and 119 visible through openings 120 and 121 in the table top, respectively.

Signal lights 122 are also provided in the table for each of the engine units to visibly indicate to the superintendent which of the engines are in operation. A signal light 123 is also provided in the board to indicate that the circuit to the board, controlled by a master switch 124, is functioning properly.

In order to indicate at the station a broken discharge line and to shut down the engines, the table is provided with a contact 125 located in the path of the contact bar 109 adjacent the lower end of the scale 13 so that should the discharge pressure drop to move the wire 54 into position so that the contact 109 engages the contact 125, the signal 126 will be energized to indicate a broken discharge line.

I also provide a similar contact 125' that is adapted to be engaged by a contact bar 109' on the wire 48 at a point adjacent the zero position of the intake scale to shut down the engine in case of an intake line break, a signal light 114' on the table top being energized to indicate a broken line. Also in connection with instances of line break, I provide the actuating motors or pressure gages 72 and 98 with arcuate contacts 72' adapted to be engaged with contact arms 87' actuated by the Bourdon tubes when the line pressures drop due to a broken line. These contacts are all connected in the same circuit as later described. The contacts on the pressure gages are an added safety feature because at the instant of the break, a suddenly dropping discharge (or intake) pressure may cause only a misfire of the engines through the contact 125 (or 125') and the units would not be shut down, but the arcuate contacts on the pressure gages can cover an arc of the movable contact arms a sufficient distance to assure the time elements necessary for actual shutting down of the units. These contacts are also useful in case the cable wires 48 and 54 should happen to break.

In order that the superintendent may visibly observe the conditions taking place, signal lights 127 and 128 are provided in line with the signal lights 122 which are connected into circuit with the signal lights 118—119 and 126, respectively.

Figure 14:
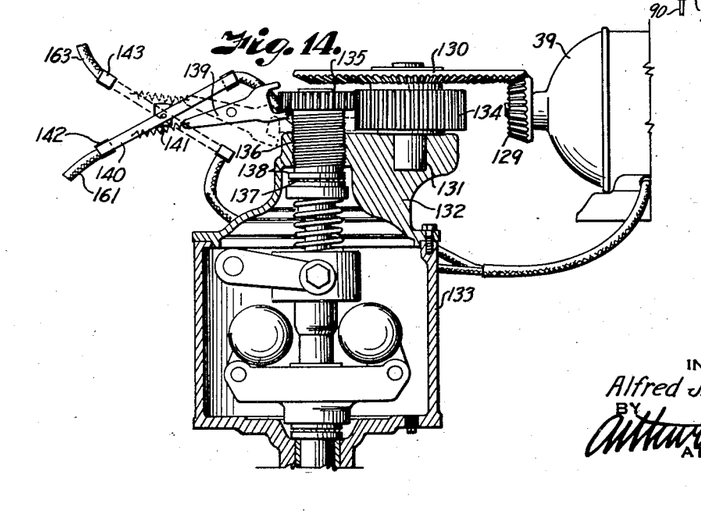
Fig. 14 is a detail sectional view through one of the governors used in controlling the engines operating the compressors.

The governor control mechanism may be of any form, but the preferred type is illustrated in Fig. 14, wherein the armature shaft of the motor 39 is provided with a bevel gear 129 meshing with a bevel gear 130 fixed to a shaft 131 rotatably mounted in a bracket 132 of the governor housing 133. Fixed on the shaft 131 is an elongated pinion 134 meshing with a gear 135 fixed to the upper end of a threaded shaft 136 threadedly supported in the governor casing 133 in line with the governor shaft and having one end bearing against a race 137 of the collar actuating the governor weights.

Rotation of the gear 135 causes the shaft 136 to move downwardly in the housing to actuate a lever 139 operably connected with a toggle switch 140 by means of a toggle spring 141 to close contacts 142 or 143 to reverse operation of the motor 39 and to effect speeding up or slowing down operation of the governor.

Figure 13:
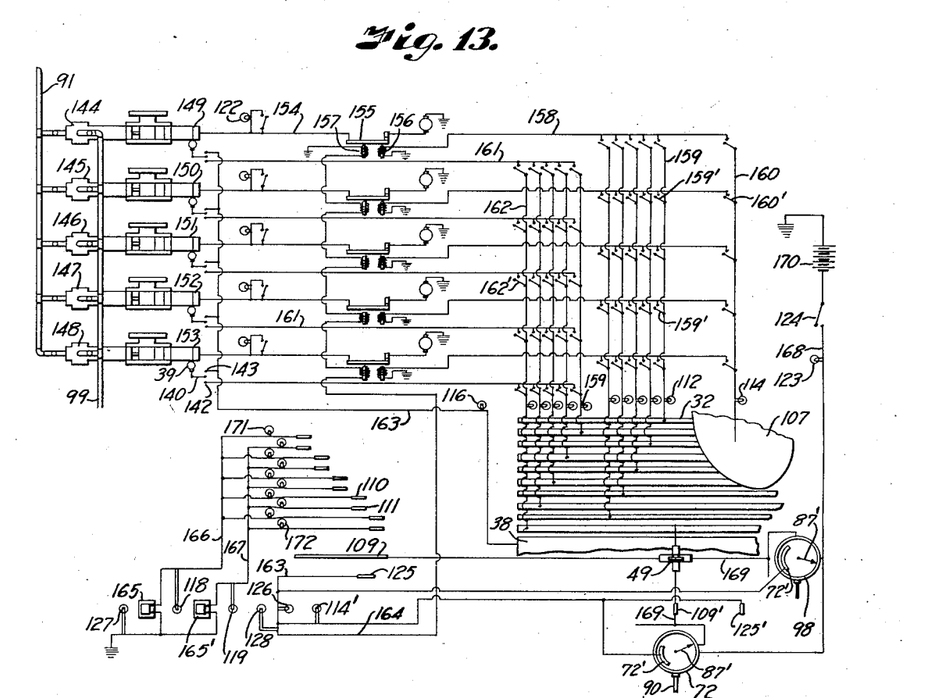
Fig. 13 is a schematic wiring diagram of the apparatus for controlling the engine units.

Fig. 13 illustrates a schematic diagram of the system wherein the respective compressor units are indicated at 144, 145, 146, 147 and 148 and shown as connected to the intake and discharge lines 91 and 99, respectively, as in customary practice.

The compressor units are shown as directly connected with the engines 149, 150, 151, 152 and 153 having ignition circuits 154 in which is interposed a switch 155 or preferably a circuit breaker of the type that is locked open when it is actuated and so adapted to be opened by solenoid magnets 156 or 157. The solenoids 156 are connected with the contact bars 32 which effect shutting down of the engine by a current flowing through conductors 158 in which are connected the signals 112 by branch conductors 159. The branch conductors 158 are selectively connected to each of the conductors through a series of switches 159 whereby any one of the conductors 158 may be connected to any one of the signals or to any one of the contact bars for shutting down the engines.

It is, therefore, apparent that the engine control circuits may be selectively connected to a selective contact bar by simply closing the switch to the selected circuit and opening all of the other switches. The solenoids 156 are also selectively connected into circuit with the plate 107 by a branch conductor 160 through switches 160' whereby one or more of the engines may be stopped when the pressure ratios are such as to move the roller 67 onto the plate 107, as heretofore mentioned. The bars 32 for slowing down operation of the engines are selectively connected by switches 162' leading to the contacts 142 of the switches 140 through the conductors 161 to energize the motors 39 for retarding the engine governors, the switches 162' being opened or closed in accordance with, or independent of, the switches 159'.

The switch contacts 143 are connected by a conductor 163 with the plate 38 to speed up the engines when the main switch is on the contact plate 38 to build up the discharge pressure to that set by the dispatcher. The circuit 163 also includes the signal 116.

The contacts 125, 125' and the arcuate contacts 72' are connected to the conductor 164 in which is connected the signal light 126 and solenoids 157 to shut down all of the engines when the bar 109 engages the contact 125, the bar 109' engages the contact 125' or when the contact arms 87' engage the contacts 72' as in the case of pipe line breaks.

The main switch contact 49 is in electric circuit with the bar 109 through the rod 54 and with audible signals 165 and 165', respectively, through conductors 166 connecting the contacts 110 and conductors 167 connecting the contacts 111. The signal lights 118 and 119 are in the circuits 166 and 167, respectively, and the signal 127 is connected in both circuits so that the light flashes when either the contacts 110 or 111 are engaged by the bar 109.

The signal 123 is electrically connected to the switch 124 by a lead 168 and to the rods 48 and 54 through the endless belts 92—93 and 102—103 and conductor 169 to supply currents to all of the circuits from a source of supply indicated by the battery 170. Signal lights 171 and 172 are also inserted in the circuits 166 and 167 to provide visible signals in the engine room to indicate to the engineer when to make ready and when to start the respective engines.

To provide for direct setting of the switch boards by the dispatcher, the shaft 25 of each switch board 18 is provided with a gear 180 which meshes with a gear 181 on the armature shaft of a reversible motor 182 carried by the tables 1, as shown in Fig. 2. All of the motors are connected in parallel to current supply lines 183, 184 and 185 that are connected to a reversing switch 186 at the dispatcher's office which sends current through the lines to drive the motors in the proper direction, Fig. 15, movement of the motors being indicated on a recorder 187 also located in the dispatcher's office. The recorder, therefore, moves in synchronism with the switch boards and carries an indicator hand 188 movable over a scale 189 conforming to the pressure scale on the tables so that when the dispatcher has closed the switch to move the pointer to the desired point on the scale, the contact bars on the table will have been moved to that point by means of the motors. The switch boards may be moved in the opposite direction by reversing the motors through the reversing switch.

In operating a system equipped with an automatic control constructed in accordance with my invention, the dispatcher determines the pressure to be maintained in the discharge line and the superintendent sets the switch board by actuating the threaded shaft 25 to position the spaced bars relatively to the set pressure on the discharge scales 13 and 13', or the dispatcher may set the switch boards from his office by closing the switch 186 until the indicator hand 188 reaches the desired point on the scale 189, for example, 400 pounds pressure as indicated in Fig. 3 of the drawings.

All four engines will then be started to build up the discharge pressure to that set by the dispatcher. As the discharge pressure increases, the rod 54 will be moved toward the spaced contact bar 32 and the rod 48 will move laterally to indicate on the scales 12 and 12' the intake pressure and to move the main switch 49 longitudinally on the rod 54. Movement of the rod 54 likewise moves the main switch on the rod 48.

When the contact roller 68 contacts the first bar, a circuit will be established from the lead 168, conductor 169, roller 68, first contact bar 32, conductor leading to the fourth engine unit and contact 142 to effect slowing down of the governor. As the pressure continues to rise, the roller 68 engages the second contact bar to establish circuit through the conductor 158 for the fourth engine, energizing the solenoid 156 to open the switch 155, thereby interrupting the ignition circuit to stop operation of the engine. Should the discharge pressure continue to rise, other engines will be likewise shut down until a pressure medium is established at 400 pounds.

Owing to the narrowness of the contact bars, (due to crowding of the bars together within a limited pressure range on the control board) the main contact may jump across the bars. However, the switch 155 will be automatically locked open to assure stopping of the engine unit connected therewith. When an engine is shut down by the board, the operators will know that the ignition circuit is open and must be reclosed before the unit can again be started up. Likewise, due to narrowness of the governor control bars, the time element may be too short to accomplish the desired effect and these bars are preferably wider than the spark bars.

In case of excessive demand or if the demand is greater than the capacity afforded by the compressors in service, the rod 54 will move in the opposite direction so that the bar 109 engages the contact 110, establishing a circuit through the bar, the contact 110, conductor 166, the audible signal 165 and visible signal 118 to indicate to the engineer to make ready for starting the engine next in line.

Should, for any reason, the pressure excessively drop in the discharge line, or should the discharge line break, the rod 54 will be moved downwardly over the switch board to engage the contact 125, establishing circuit through the conductor 164 and solenoids 157 to shut down all of the engines in operation.

In case of a broken intake line or should, for any reason, the ratios between the intake and discharge pressures become excessive and greater than that for which the engine equipment was designed, the rods 48 and 54 will move the contact bar 49 into engagement with the plate 107 to establish circuit through the conductor 160 and solenoids 156 to shut down all of the engines in the same manner as in case of a broken discharge line. In case the contact element 49 is below the plate 107, the bar 109' on the wire 48 will engage the contact 125' to give the same effect.

From the foregoing, it is apparent that I have provided a system for controlling operation of the engine compressors so as to automatically maintain a substantially fixed predetermined pressure in the discharge line, and I have provided safety factors to protect the station power in case of broken intake or discharge lines that place excessive loads on the engines and prevent the hazard of an explosion in the pipe line through drawing air into the intake of the broken line. It is also apparent that with stations equipped in accordance with my invention all of the stations can be made to operate in balance to maintain predetermined discharge pressures at each or all of the stations.

While I have specifically described a single arrangement of the bars upon the switch board, it is obvious that the bars, contacts and signals may be differently arranged by actuating the switches 159' and 162' so that the conditions on the board may be suited to the various installations that may arise at the different stations in which the boards may be installed. For example, a number of units may be connected from the same bar, thus multiplying the control effect by the number of units attached to each bar; the sequence of the bars with respect to the engines may be changed; or the plate 107 may be connected to all, or such engines as may be desired.

What I claim and desire to secure by Letters Patent is:

1. In combination with a compressor, a prime mover driving the compressor and intake and discharge lines connected with the compressor and having independent supply and discharge sources, and means operable in response to changes in pressure ratio in the intake and discharge lines for controlling operation of the prime mover including means for maintaining a selective predetermined discharge pressure with variable intake pressures.

2. In combination with a compressor, an engine driving the compressor and intake and discharge lines connected with the compressor and having independent supply and discharge sources, and means operable in response to changes in pressure ratio in the intake and discharge lines for controlling operation of the engine including means for selectively maintaining a predetermined discharge pressure with variable intake pressures.

3. In combination with a compressor, a prime mover driving the compressor and intake and discharge lines connected with the compressor, pressure actuated means operable in response to pressure in the discharge line, a second and independent pressure actuated means operable in response to pressure in the intake line, and means operable by one of said pressure actuated means and under influence by the other of said pressure actuated means for controlling operation of the prime mover.

4. In combination with a compressor, a prime mover driving the compressor and intake and discharge lines connected with the compressor, pressure actuated means responsive to pressure in the discharge line, a switch control means operably connected with said pressure actuated means, a second and independent pressure actuated means responsive to pressure in the intake line, a second switch control means operably connected with the last named pressure responsive means, a switch operably connected by both of said control means, and a circuit connecting said switch for controlling operation of the prime mover.

5. In combination with a compressor, a prime mover driving the compressor and intake and discharge lines connected with the compressor, means for shutting down the prime mover when a predetermined discharge pressure is reached, and means operable in response to changes in pressure ratio in the intake and discharge lines for controlling operation of the prime mover including means for selectively maintaining said predetermined discharge pressure with variable intake pressures.

6. In combination with a compressor, a prime mover driving the compressor and intake and discharge lines connected with the compressor, means controlling pressure in the discharge line comprising an actuator operable in response to pressure in the discharge line, a switch controlling operation of the prime mover, means operably connecting the actuator with the switch, means including a contact element associated with the switch for stopping the prime mover when the pressure in the discharge line reaches a predetermined amount, and means for selectively moving said contact element relatively to the switch for maintaining a selective discharge pressure.

7. In combination with a compressor, a prime mover driving the compressor and intake and discharge lines connected with the compressor, means controlling pressure in the discharge line comprising an actuator operable in response to pressure in the discharge line, a switch controlling operation of the prime mover, means operably connecting the actuator with the switch, a circuit including a contact element rendered effective by the switch for reducing speed of the prime mover when the pressure in the discharge line reaches a predetermined amount, and means for selectively moving the contact element relatively to said switch.

8. In combination with a compressor, a prime mover driving the compressor and intake and discharge lines connected with the compressor, means controlling pressure in the discharge line comprising an actuator operable in response to pressure in the discharge line, a switch controlling operation of the prime mover, means operably connecting the actuator with the switch, means associated with the switch for stopping the prime mover when the pressure in the discharge line reaches a predetermined amount, an independent actuator responsive only to pressure in the intake line, and means connecting said last named actuator with the switch for stopping operation of the prime mover when the pressure in the intake line drops below a predetermined value relatively to the discharge pressure.

9. In combination with a compressor, a governor controlled engine driving the compressor and intake and discharge lines connected with the compressor, means controlling operation of the engine comprising a table having a discharge pressure scale, an actuator carried by the table responsive to pressure in the discharge line, a switch carrying member movable along the discharge pressure scale and operable by the actuator, a switch member carried by the switch carrying member, a switch board mounted in the table, a contact bar on the switch board, an electric circuit operably connecting the contact bar with the governor controlling speed of the engine, and means for moving said bar relatively to said switch member whereby the switch member will contact said bar to control operation of the engine when the pressure in the discharge line reaches a predetermined degree.

10. In combination with a compressor, a governor controlled engine driving the compressor and intake and discharge lines connected with the compressor, means controlling the engine comprising a table having a discharge pressure scale, an actuator carried by the table responsive to pressure in the discharge line, a switch carrying member operable by the actuator and movable across the discharge pressure scale, a switch member carried by the switch carrying member, a movable switch board slidably mounted in the table, spaced contact bars on the switch board, electric circuits operably connecting one of the contact bars to stop the engine, an electrical circuit connecting the other of said bars with governor to reduce speed of the engine, and means for moving said table relatively to said switch member whereby the switch member will contact said bars to reduce speed and stop the engine when the pressure in the discharge line reaches a predetermined degree.

11. In combination with a compressor, an engine driving the compressor and intake and discharge lines connected with the compressor, means controlling the engine comprising a table having an intake pressure scale and a discharge pressure scale, an actuator carried by the table responsive to pressure in the discharge line, a switch carrying member operable by the actuator and movable across the discharge pressure scale, a switch member carried by the switch carrying member, a movable switch board slidably mounted in the table, spaced contact bars on the switch board, an electric circuit operably connecting one of the contact bars to reduce speed of the engine, an electrical circuit connecting the other of said bars to stop the engine, means for moving said table relatively to said switch member whereby the switch member will contact said bars to control operation of the engine when the pressure in the discharge line reaches a predetermined degree, and means carried by the table responsive to pressure in the intake line and operably connected with the switch member for stopping operation of the engine when the pressure ratios in the intake and discharge lines reach a predetermined value.

12. In a device of the character described, a table, a switch board in the table, a pressure actuated member carried by the table, means supplying a pressure medium to said pressure actuated member, a pulley on the pressure actuated member, spaced pulleys aligning with said first named pulley, a cable operating over said pulleys, a second pair of pulleys aligning with said spaced pulleys, a cable operable over the last pair of pulleys, a rod operably connecting the cables and movable across said switch board, and a switch contact member carried by the rod and movable thereby over the switch board.

13. In a device of the character described, a table, a switch board mounted in the table, a pressure actuated member carried by the table, means for supplying a pressure medium to said pressure actuated member, a pulley on the pressure actuated member, spaced pulleys aligning with said first named pulley, a cable operating over said pulleys, a second pair of pulleys aligning with said spaced pulleys, a cable operable over the last pair of pulleys, a rod operably connecting the cables and movable across said switch board, a switch contact member carried by the rod and movable thereby over the switch board, and means on the table for shifting said switch board relatively to said switch contact member.

14. In a device of the character described, a table, a switch board movably mounted in the table, a pressure actuated member carried by the table, means for supplying a pressure medium to said pressure actuated member, a pulley on the pressure actuated member, spaced pulleys aligning with said first named pulley, a cable operating over said pulleys, a second pair of pulleys aligning with the spaced pulleys, a cable operable over the last pair of pulleys, a rod operably connecting the cables and movable across said switch board, a switch contact member carried by the rod and movable thereby over the switch board, means on the table for shifting said switch board relatively to said switch contact member, a second pressure actuated member, means for supplying a pressure medium to said second pressure actuated member, spaced pairs of pulleys carried by the table and operable at right angles to the first named pulleys, cables operating over the last named pairs of pulleys, and a rod connecting the last named cables and extending at right angles across the first named rod to move said switch contact member in a direction at right angles to its movement by the first named rod.

15. In combination with a compressor, a prime mover driving the compressor, mechanism controlling the prime mover, and intake and discharge lines connected with the compressor, means controlling operation of the prime mover comprising a table having a discharge pressure scale, an actuator carried by the table responsive to pressure in the discharge line, a switch carrying member associated with the discharge pressure scale and operable by the actuator, a switch member carried by said carrying member, a switch board mounted in the table, a contact bar on the switch board, an electric circuit operably connecting the contact bar with the control mechanism for regulating speed of the prime mover, and means for moving said bar relatively to said switch member whereby the switch member will contact said bar to control operation of the prime mover when the pressure in the discharge line reaches a predetermined degree.

16. In combination with a compressor, a prime mover driving the compressor, mechanism controlling the prime mover, and intake and discharge lines connected with the compressor, means controlling the prime mover comprising a table having a discharge pressure scale, an actuator carried by the table responsive to pressure in the discharge line, a member operable by the actuator and movable across the discharge pressure scale, a switch member movable by said member that is operated by said actuator, a movable switch board slidably mounted in the table, spaced contact bars on the switch board, electric circuits operably connecting one of the contact bars to stop the prime mover, an electrical circuit connecting the other of said bars with said control mechanism to reduce speed of the prime mover, and means for moving said table relatively to said switch member whereby the switch member will contact said bars to reduce speed and stop the prime mover when the pressure in the discharge line reaches a predetermined degree.

17. In a compressor station, a plurality of compressor units having intake and discharge connections with a pipe line, actuators for actuating the compressor units for establishing pressure differential at the intake and discharge connections, means for controlling the actuators including a plurality of contact elements for each actuator, a movable switch element movable over the contact elements, means operable by said pressure differential to move the switch element over the contact elements for controlling said actuators, and means for selectively moving the contact elements relatively to the movable switch element.

18. In a compressor station, a plurality of compressor units having intake and discharge connections with a pipe line, actuators for actuating the compressor units for establishing pressure differential at the intake and discharge connections, means for controlling the actuators including a plurality of contact elements for each actuator, a movable switch element movable over the contact elements, means operable by said pressure differential to move the switch element over the contact elements for controlling said actuators, and means for selectively connecting the contact elements with any one of said actuators.

19. In a compressor station, a plurality of compressor units having intake and discharge connections with a pipe line, actuators for actuating the compressor units for establishing pressure differential at the intake and discharge connections, means for controlling the actuators including a plurality of contact elements for each actuator, a movable switch element movable over the contact elements, means operable by said pressure differential to move the switch element over the contact elements for controlling said actuators, and means including a circuit independent of said contact elements for stopping selected units when the pressure differential approaches a predetermined value.

20. In combination with a compressor, intake and discharge lines connected with the compressor, and means for operating the compressor, control means for the operating means including pressure operated actuators, means respectively connecting the actuators with the intake and discharge sides of the compressor, a switch board, a contact element on the switch board, a circuit connecting the contact element with the compressor operating means, a switch element in the circuit, means connecting the switch element with one of the actuators for moving the switch element in one direction across said contact, and means connecting the switch element with the other pressure operated actuator for movement of the switch element in a lateral direction across said contact.

21. In combination with a compressor, intake and discharge lines connected with the compressor and means for operating the compressor, control means for the operating means including pressure operated actuators, means respectively connecting the actuators with the intake and discharge sides of the compressor, a switch board, a support for the switch board, means movably mounting the switch board on the support, a contact element on the switch board, a circuit connecting the contact element with the compressor operating means, a switch element in the circuit, means connecting the switch element with one of said pressure operated actuators to move the switch element in one direction, means connecting the switch element with the other pressure operated actuator for moving the switch element in a lateral direction, and means for adjusting the switch board on said support relatively to said switch element.

22. In a compressor station, a plurality of compressor units having intake and discharge connections with a pipe line, prime movers for the compressor units, means for controlling operation of the prime movers including pressure operated actuators, means respectively connecting the pressure operated actuators with the intake and discharge sides of the compressor units, a switch board, contact elements on the switch board, circuits connecting the contact elements with the respective prime movers, a switch element connected in said circuits, means connecting the switch element with one of said pressure operated actuators to move the switch element in one direction relative to the contact elements to successively engage said elements, a single contact element connected with all of the prime movers, and means connecting the switch element with said other pressure operated actuator for moving the switch element to and from said single contact element.

23. In a compressor station, a plurality of compressor units having intake and discharge connections with a pipe line, prime movers for the compressor units, means for controlling operation of the prime movers including pressure operated actuators, means respectively connecting the pressure operated actuators with the intake and discharge sides of the compressor units, a switch board, contact elements on the switch board, circuits connecting the contact elements with the respective prime movers, a switch element connected in said circuits, means connecting the switch element with one of said pressure operated actuators to move the switch element in one direction relative to the contact elements to successively engage said elements, a single contact element connected with all of the prime movers, means connecting the switch element with said other pressure operated actuator for moving the switch element to and from said single contact element, and means for moving the switch board relative to the switch element.

ALFRED J. DIESCHER.